(12) United States Patent
Jamadagni et al.

(10) Patent No.: US 10,701,599 B2
(45) Date of Patent: Jun. 30, 2020

(54) SYSTEMS AND METHODS OF TRANSMITTING AND SWITCHING EMBMS SERVICE IN A HETEROGENEOUS NETWORK

(71) Applicant: Reliance Jio Infocomm Limited, Mumbai (IN)

(72) Inventors: Satish Nanjunda Swamy Jamadagni, Bengaluru (IN); Sarvesha Anegundi Ganapathi, Bengaluru (IN); Pradeep Krishnamurthy Hirisave, Bengaluru (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days.

(21) Appl. No.: 15/766,133

(22) PCT Filed: Oct. 20, 2016

(86) PCT No.: PCT/IB2016/056320
§ 371 (c)(1),
(2) Date: Apr. 5, 2018

(87) PCT Pub. No.: WO2017/068529
PCT Pub. Date: Apr. 27, 2017

(65) Prior Publication Data
US 2018/0288659 A1    Oct. 4, 2018

(30) Foreign Application Priority Data

Oct. 21, 2015 (IN) .......................... 3990/MUM/2015

(51) Int. Cl.
*H04W 36/00* (2009.01)
*H04W 4/06* (2009.01)
(Continued)

(52) U.S. Cl.
CPC ......... *H04W 36/0066* (2013.01); *H04W 4/06* (2013.01); *H04W 36/0007* (2018.08);
(Continued)

(58) Field of Classification Search
CPC . H04W 36/0066; H04W 48/18; H04W 48/16; H04W 36/30; H04W 36/0022;
(Continued)

(56) References Cited

U.S. PATENT DOCUMENTS

| 2011/0064050 A1* | 3/2011 | Livet | ...................... H04H 20/26 370/331 |
| 2014/0003322 A1* | 1/2014 | Grinshpun | .......... H04W 36/026 370/312 |

(Continued)

FOREIGN PATENT DOCUMENTS

JP        2015529995 A      10/2015

OTHER PUBLICATIONS

International Search Report for PCT/IB2016/056320 dated Jan. 9, 2017.

(Continued)

*Primary Examiner* — Lakeram Jangbahadur
(74) *Attorney, Agent, or Firm* — Ladas & Parry, LLP

(57) ABSTRACT

Systems and methods may provide transmitting and switching transmission of an evolved multimedia broadcast multicast service (eMBMS) from a first radio access technology [120] to a second radio access technology [130]. Embodiments may provide a method encompassed by receiving the eMBMS service and at least one control channel parameter through the first radio access technology [120]; detecting availability of the second radio access technology [130]; transmitting the at least one configuration parameter relating to the second radio access technology [130]; checking authentication of the second radio access technology [130]

(Continued)

to receive the eMBMS service; and switching the evolved multimedia broadcast multicast service from the first radio access technology [120] to the second radio access technology [130]. Further, the switching is based on one of at least one configuration parameter, an authentication report and combination thereof, by one of the user equipment [140], the network entity [110] and combination thereof.

30 Claims, 7 Drawing Sheets

(51) Int. Cl.
*H04W 36/30* (2009.01)
*H04W 48/16* (2009.01)
*H04W 48/18* (2009.01)
*H04W 88/06* (2009.01)
*H04W 36/14* (2009.01)
*H04W 12/06* (2009.01)
*H04W 48/08* (2009.01)

(52) U.S. Cl.
CPC ....... *H04W 36/0022* (2013.01); *H04W 36/30* (2013.01); *H04W 48/16* (2013.01); *H04W 48/18* (2013.01); *H04W 88/06* (2013.01); H04W 12/06 (2013.01); H04W 36/14 (2013.01); H04W 48/08 (2013.01)

(58) Field of Classification Search
CPC ... H04W 88/06; H04W 4/06; H04W 36/0007; H04W 48/08; H04W 12/06; H04W 36/14
See application file for complete search history.

(56) References Cited

U.S. PATENT DOCUMENTS

| 2014/0119267 A1* | 5/2014 | Santhanam | ............. H04W 4/06 370/312 |
| 2015/0208286 A1* | 7/2015 | Ozturk | ............. H04W 36/0022 370/331 |

OTHER PUBLICATIONS

Written Opinion of the International Search Authority PCT/IB2016/056320 dated Jan. 9, 2017.

* cited by examiner

SYSTEMS AND METHODS OF TRANSMITTING AND SWITCHING EMBMS SERVICE IN A HETEROGENEOUS NETWORK

CROSS-REFERENCE TO RELATED APPLICATIONS

This application is the U.S. national phase of PCT Application PCT/IB2016/056320 filed on Oct. 20, 2016, which claims priority to Indian patent application No. 3990/MUM/2015 filed on Oct. 21, 2015, the disclosures of which are incorporated herein by reference in their entireties.

TECHNICAL FIELD

Embodiments of the present disclosure generally relate to communication systems. More particularly, embodiments of the present disclosure relate to transmitting and switching of evolved multimedia broadcast multicast services (eMBMS) from one radio access technology to another alternative radio access technology, and vice versa.

BACKGROUND

Long term evolution (LTE) broadcast using evolved Multimedia Broadcast Multicast Services (eMBMS) technology enables operators to efficiently launch media services over LTE network to meet demand and support of users in a wide range of new use cases. Presently, with the advancement in the technology, a user is capable of availing services such as television services, live video streaming services or a file downloading service over a Long-Term Evolution (LTE) network by a user equipment [140] (UE). These services are delivered to the user over the LTE network by an evolved Multimedia Broadcast Multicast Services (eMBMS). The eMBMS is a point-to-multipoint interface as per specification for 3GPP cellular networks, which is designed to provide efficient delivery of broadcast and multicast services.

Up till now, the eMBMS service for delivering the television services, the live video streaming services and/or the file downloading is provided to the user only over the LTE network. Currently, control and data channels for the eMBMS are already defined for the LTE network. However, there is no provision for using additional existing data channels for providing the eMBMS Services. Further, none of the existing technologies discloses transmitting and switching of the eMBMS services to the user having a mobile device, from LTE channel to a Wi-fi channel, and vice versa.

Accordingly, there is a need in the art to provide a transmitting and switching technique for providing the eMBMS services, thereby overcoming the drawbacks inherent in the existing arts. Further, there is a need to provide a system and mechanism for co deployment of multiple radio access technology having different channels which can be switched in between to provide the eMBMS service to the user.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may provide a system for transmitting and switching transmission of an evolved multimedia broadcast multicast service from a first radio access technology [120] to a second radio access technology [130], the system comprising: a network entity [110] configured to: transmit at least one configuration parameter relating to the second radio access technology [130] to a user equipment [140], wherein the network entity [110] is one of an evolved node B, a broadcast multicast service controller, an access network discovery and selection function entity and combination thereof. Further, the user equipment [140] receives the evolved multimedia broadcast multicast service and at least one control channel parameter from the broadcast multicast service controller through the first radio access technology [120], the least one control channel parameter is received through at least one multicast control to indicate the availability of second radio access technology [130] supporting the evolved multimedia broadcast multicast service, and the least one control channel parameter is a system information broadcast. Further, the network entity [110] is configured to check authentication of the second radio access technology [130] to receive the evolved multimedia broadcast multicast service to generate an authentication report, and switch the evolved multimedia broadcast multicast service from the first radio access technology [120] to the second radio access technology [130] based on one of the authentication report, the at least one configuration parameter, a system information block information, a logic function transmitted by the access network discovery and selection function entity and combination thereof, wherein the logic function indicates if the user equipment [140] is capable receiving the evolved multimedia broadcast multicast service through the second radio access technology [130]. Further, the embodiments of the present disclosure encompass a system for transmitting and switching transmission of an evolved multimedia broadcast multicast service from a first radio access technology [120] to a second radio access technology [130], the system [100] comprising: a user equipment [140], wherein the user equipment [140] is configured to: receive the evolved multimedia broadcast multicast service, at least one control channel parameter and combination thereof through the first radio access technology [120], and detect availability of the second radio access technology [130], wherein the detection is one of continuous, periodic and combination thereof, and the detection is based on at least one configuration parameter relating to the second radio access technology [130]. Further, the system [100] comprises a service provider module processor (also referred to as a service provider module) [150] and a network entity [110] configured to transmit at least one parameter relating to the second radio access technology [130] to the user equipment [140], wherein the transmission is based on detection of the second radio access technology [130]. The network entity [110] is configured to check authentication of the second radio access technology [130] to receive the evolved multimedia broadcast multicast service to generate an authentication report, and the user equipment [140] configured to switch the evolved multimedia broadcast multicast service from the first radio access technology [120] to the second radio access technology [130] based on one of an access network discovery and selection function information broadcasted, the authentication report and combination thereof, wherein the access network discovery and selection function information is broadcasted by the service provider module [150].

Furthermore, the embodiments of the present disclosure encompass a method of transmitting and switching transmission of an evolved multimedia broadcast multicast service from a first radio access technology [120] to a second radio access technology [130], the method being performed by a network entity [110], the method comprising: transmitting, via one or more hardware processors, the evolved multimedia broadcast multicast service and at least one control channel parameter through the first radio access technology [120] to a user equipment [140]; transmitting, via the one or more hardware processors, at least one configuration parameter relating to the second radio access technology [130] by one of a network entity [110], a service provider module [150] and combination thereof to the user equipment [140]; checking, via the one or more hardware processors, authentication of the second radio access technology [130] to receive the evolved multimedia broadcast multicast service by the network entity [110] to generate an authentication report; and switching, via the one or more hardware processors, the evolved multimedia broadcast multicast service from the first radio access technology [120] to the second radio access technology [130] based on one of the at least one configuration parameter, the authentication report and combination thereof, by one of the user equipment [140], the network entity [110] and combination thereof.

Moreover, the embodiments of the present disclosure encompass another method of transmitting and switching transmission of an evolved multimedia broadcast multicast service by a user equipment from a first radio access technology to a second radio access technology, the method being performed by a user equipment [110], the method comprising: receiving, via one or more hardware processors, the evolved multimedia broadcast multicast service and at least one control channel parameter through the first radio access technology; detecting, via the one or more hardware processors, availability of the second radio access technology. The detection is based on at least one configuration parameter related to the second radio access technology. Further, the method comprising steps of receiving, via the one or more hardware processors, the at least one configuration parameter relating to the second radio access technology from a network entity [110]; receiving, via the one or more hardware processors, an authentication report that indicates whether the second radio access technology [120] is authenticated to receive the evolved multimedia broadcast multicast service; and switching, via the one or more hardware processors, the evolved multimedia broadcast multicast service from the first radio access technology to the second radio access technology based on one of the at least one configuration parameter, the authentication report and combination thereof.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings include disclosure of electrical components or circuitry commonly used to implement such components.

DETAILED DESCRIPTION

Figure 1A:
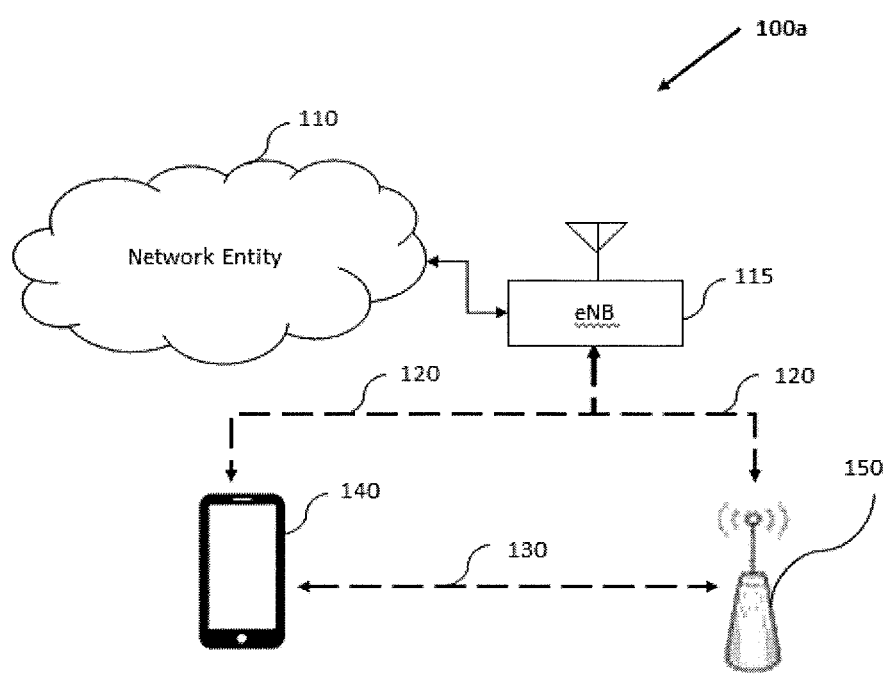
FIG. 1 illustrates a simplified system architecture in accordance with an embodiment of the present disclosure.
FIG. 1b illustrates a detailed system architecture in accordance with an embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure provide systems and methods for using alternative data channels (or available bandwidth) of other available network/radio access technology for delivering evolved multimedia broadcast multicast services (eMBMS) data to a user equipment [140] (UE). Further, a transmitting and switching of eMBMS data is performed between two radio access technologies in accordance with the present disclosure, wherein the switching is done by offloading the eMBMS services from one radio access technology through which the eMBMS service is ongoing to the alternative radio access technology. The 'transmitting' as used herein is one of broadcasting and multicasting of eMBMS service. The 'user equipment [140] (UE)' as used herein refers to a handheld device.

The user equipment [140] may include, but are not limited to, a mobile phone, a tablet, a phablet, a laptop, a desktop computer, a personal digital assistants (PDAs), and devices obvious to a person skilled in the art. Further, the user equipment [140] may comprise an input means such as keyboard, an operating system, a memory unit, a display interface, etc.

The 'first radio access technology [120] and the 'second radio access technology [130]' as used herein refers to a medium/radio link to which the user equipment [140] is connected and through which a data service such as eMBMS service is provided to the user equipment [140]. Further, the first radio access technology [120] may be a wireless link which include, but are not limited to, a long term evolution (LTE), long term evolution (LTE) advanced, HSPA, WCDMA, GSM network, a TV white space spectrum, 5 g core (as per 3gpp TR23799), CPE, and air interfaces. Further, the second radio access technology [130] may include, but are not limited to, Wireless Fidelity (Wi-Fi)

network, wireless personal area networks, wireless local area network, Wireless wide area network, light fidelity network or any combination thereof. However, the technologies over which the present disclosure may be implemented is non-limiting and may be deployed on future standards of communication.

The eMBMS may also be used to multicast protected content such as purchased data such as a commercial movie file. The purchased data is encrypted over the air, and the user of the user equipment [140] is authenticated to ensure that only authorized users can access the purchased data. The security architecture of eMBMS is based on a LTE modem [414] Subscriber Identity Module (SIM) card, wherein the SIM card authenticates and provides the security system, a master key which allows access in decoding the protected content.

Further, the systems and methods encompassed by the present disclosure provides transmitting and switching of the eMBMS service from a first radio access technology [120] to a second radio access technology [130]. In an embodiment, the eMBMS service is provided to the user equipment [140] through a first radio access technology [120], while the user equipment [140] is capable of measuring at least one configuration parameter of an available second radio access technology [130]. Further, the present disclosure encompasses transmitting and switching of the eMBMS services from the first radio access technology [120] to the second radio access technology [130] based on the at least one configuration parameter and, thereby, providing the eMBMS service to the user equipment [140] through the second radio access technology [130].

Furthermore, the first radio access technology [120] and the second radio access technology [130] are different from each other. Thus, the switching of the eMBMS service is provided in a heterogeneous network environment. The configuration parameter of the available second network may be, but not limited to, at least one signal strength information, SSID, PLMN, cell ID, frequency identifier, radio access technology, frequency band of the second radio access technology [130], TMGI and combination thereof.

The systems of the present disclosure encompass a transmitting and switching module (or switching hardware processor) which is configured to decide whether to switch the eMBMS service to the second radio access technology [130] based on the measured at least one configuration parameter and switch the eMBMS service to the second radio access technology [130] based on the at least one configuration parameter. For example, the switching processor may be programmed to perform functions to decide which network technology to use. Further, the switching may be initiated by one of the user equipment [140], a network entity [110] and combination thereof. The 'network entity [110]' as used herein refers to a module or processor present at the network side to which the user equipment [140] is connected. The network entity [110] may include, but are not limited to, an evolved node B (eNB), a BMSC (eMBMS Broadcast Multicast Service Controller), an access network discovery and selection function (ANDSF) entity and combination thereof.

Figure 1B:
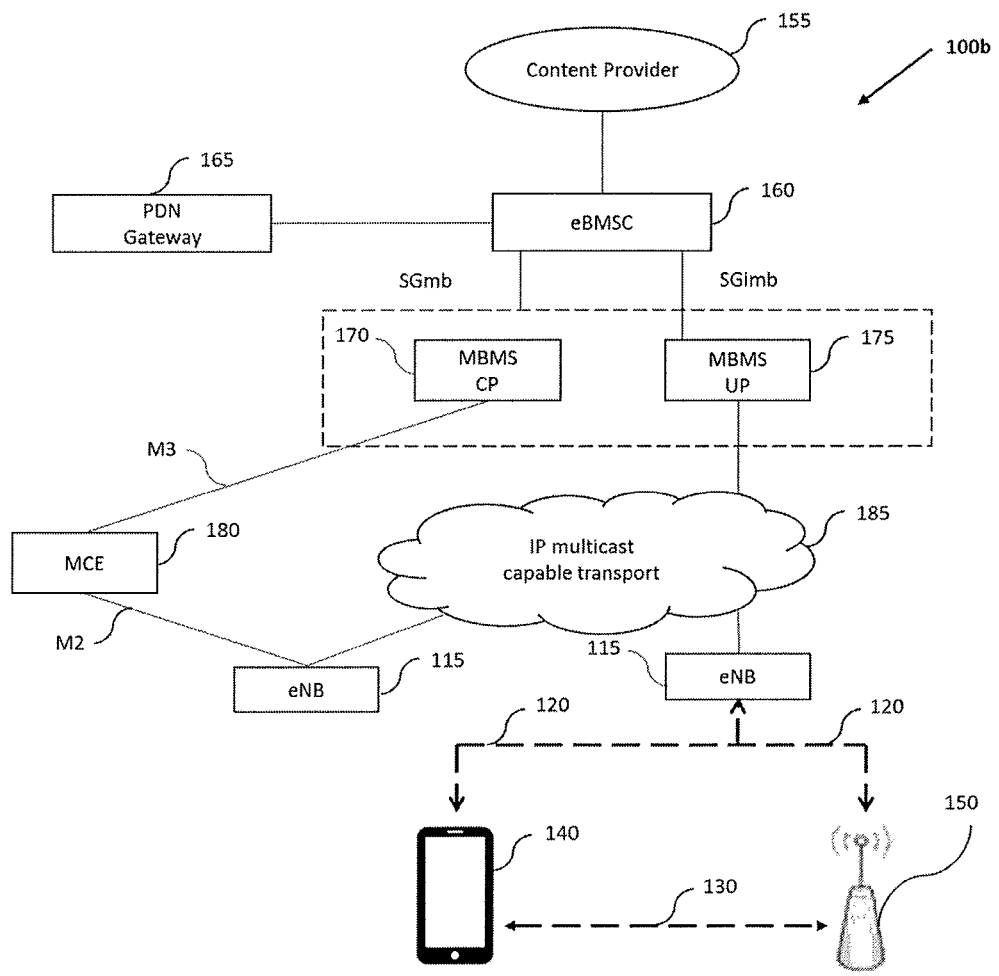

FIG. 1a and FIG. 1b illustrates an exemplary embodiment of the present disclosure and encompass systems for transmitting and switching of the eMBMS services from a first radio access technology [120] to a second radio access technology [130], wherein the switching is done by one of the user equipment [140], the network entity [110] and combination thereof. In one embodiment, the present disclosure encompasses a system [100] comprising: the network entity [110] of a network element, the user equipment [140], and a service provider module [150]. The term 'network element' as used herein may refer to the network entity [110], the service provider module [150], or a combination of both the network entity [110] and the service provider module [150]. The network entity [110] is configured to transmit at least one configuration parameter relating to the second radio access technology [130] to a user equipment [140], wherein the network entity [110] is one of an evolved node B, a broadcast multicast service controller, an access network discovery and selection function entity and combination thereof. As illustrated in FIG. 1b, the network entity [110] may further comprise of a content provider module, a PDN gateway, an evolved MBSC, a MBMS CP, a MBMS UP, a multicast coordinator entity (MCE), and an IP multicast capable transport module.

The MBMS/PDN Gateway (MBMS GW) is a the logical node handling the multicast of IP packets from the BMSC to all the LTE base station such as enhanced Node B, and eNB, wherein the BMSC is capable of supporting multicast and broadcast to the LTE network. eMBMS is also capable of supporting multimedia streaming applications as well as file download. Further, a session control is handled by the PDN Gateway via the Mobile Management Entity (MME) which is not the MBMS related network element and is a part of the 3GPP Release 8 of the network architecture. The MME handles all tasks which are non-related to the air interface, meaning thereby, terminating all Non-Access Stratum (NAS) protocols in the MME. The key element for the MBMS in the LTE is the MCE which coordinates the use of same resources and transmission parameters across all radio cells that belong to Multicast-broadcast single-frequency network (MBSFN) area.

Further, the user equipment [140] receives the evolved multimedia broadcast multicast service (eMBMS) and at least one control channel parameter from the broadcast multicast service controller (BMSC) through the first radio access technology [120], wherein the least one control channel parameter is received through at least one multicast control channel (MCCH) to indicate the availability of second radio access technology [130] supporting the evolved multimedia broadcast multicast service (eMBMS). Further, the network entity [110] is configured to check authentication of the second radio access technology [130] to receive the evolved multimedia broadcast multicast service to generate an authentication report; and switch the evolved multimedia broadcast multicast service from the first radio access technology [120] to the second radio access technology [130] based on one of the authentication report, the at least one configuration parameter, a system information block information, a logic function transmitted by the access network discovery and selection function entity and combination thereof.

The logic function indicates if the user equipment [140] is capable receiving the evolved multimedia broadcast multicast service through the second radio access technology [130]. The least one control channel parameter as used herein includes a system information broadcast (SIB) and in a preferred embodiment the SIB (17) is used carry information pertaining to the service provider module [150] supporting the eMBMS service in the overlapped region of the eNode B (eNB).

In yet another embodiment the user equipment [140] may indicate to the network entity [110] that the eMBMS service is being accessed over an alternative radio access point i.e. through the service provider module [150], wherein the service provider module [150] includes, but not limited to, a Wi-Fi access point, a small cell, and a femtocell. The SIB 17 information is used by the LTE eNB to switch off the eMBMS service in an event all users are switched to the Wi-Fi channels i.e. on the second radio access technology [130].

In yet another embodiment, when an indication comes on the multicast control channel (MCCH) that the eMBMS service is being shifted to the Wi-Fi channel, the user equipment [140] receiving the eMBMS service is expected to shift to the Wi-Fi channels for receiving the eMBMS service. Further, when a session switch on the multicast control channel, the multicast control channel will also indicate the exact time of ending of the session on the first radio access technology [120] i.e. on the LTE link. Moreover, information relating to the time of day may be obtained by the user equipment [140] from the multicast control channel; or by a SIB16 information broadcast which is broadcast on the eNB.

In an exemplary embodiment, the information update using the system information broadcast (SIB) 17 is given below:

```
-- ASN1START
SystemInformationBlockType17-r12 ::= SEQUENCE {
wlan-OffloadInfoPerPLMN-List-r12 SEQUENCE (SIZE
(1..maxPLMN-r11)) OF
WLAN-OffloadInfoPerPLMN-r12 OPTIONAL, -- Need OR
lateNonCriticalExtension OCTET STRING OPTIONAL,
...
wlan-OffloadInfoPerEmbmsService-List-r12 SEQUENCE (SIZE
(1..maxTmgi-r11))
OF
WLAN-OffloadInfoPerEmbmsService-r12 OPTIONAL, -- Need OR
lateNonCriticalExtension OCTET STRING OPTIONAL,
........
}
WLAN-OffloadInfoPerPLMN-r12 ::= SEQUENCE {
wlan-OffloadConfigCommon-r12 WLAN-OffloadConfig-r12
OPTIONAL, -- Need OR
wlan-Id-List-r12 WLAN-Id-List-r12 OPTIONAL, -- Need OR
...
}
WLAN-Id-List-r12 ::= SEQUENCE (SIZE (1..maxWLAN-Id-r12)) OF
WLAN-Identifiers-r12
WLAN-OffloadInfoPerEmbmsService-ListN-r12 ::= SEQUENCE {
wlan-OffloadConfigCommon-r12 WLAN-OffloadConfig-r12
OPTIONAL, -- Need OR
wlan-Id-List-r12 WLAN-Id-List-r12 OPTIONAL, -- Need OR
...
}
WLAN-Id-List-r12 ::= SEQUENCE (SIZE (1..maxWLAN-Id-r12)) OF
WLAN-Identifiers-r12
```

In another embodiment, the present disclosure encompasses a system comprising: the user equipment [140]; the service provider module [150]; and network entity [110]. The user equipment [140] is configured to receive the evolved multimedia broadcast multicast service (eMBMS), at least one control channel parameter and combination thereof through the first radio access technology [120] and detect availability of the second radio access technology [130]. The detection may be one of continuous, periodic and combination thereof. Further, the detection is based on at least one configuration parameter relating to the second radio access technology [130].

Further, service provider module [150] and a network entity [110] is configured to transmit at least one parameter relating to the second radio access technology [130] to the user equipment [140] based on detection of the second radio access technology [130]. The network entity [110] is configured to check authentication of the second radio access technology [130] to receive the evolved multimedia broadcast multicast service to generate an authentication report. The user equipment [140] is configured to switch the evolved multimedia broadcast multicast service from the first radio access technology [120] to the second radio access technology [130] based on one of an access network discovery and selection function information broadcasted, the authentication report and combination thereof, wherein the access network discovery and selection function information is broadcasted by the service provider module [150].

Figure 2:
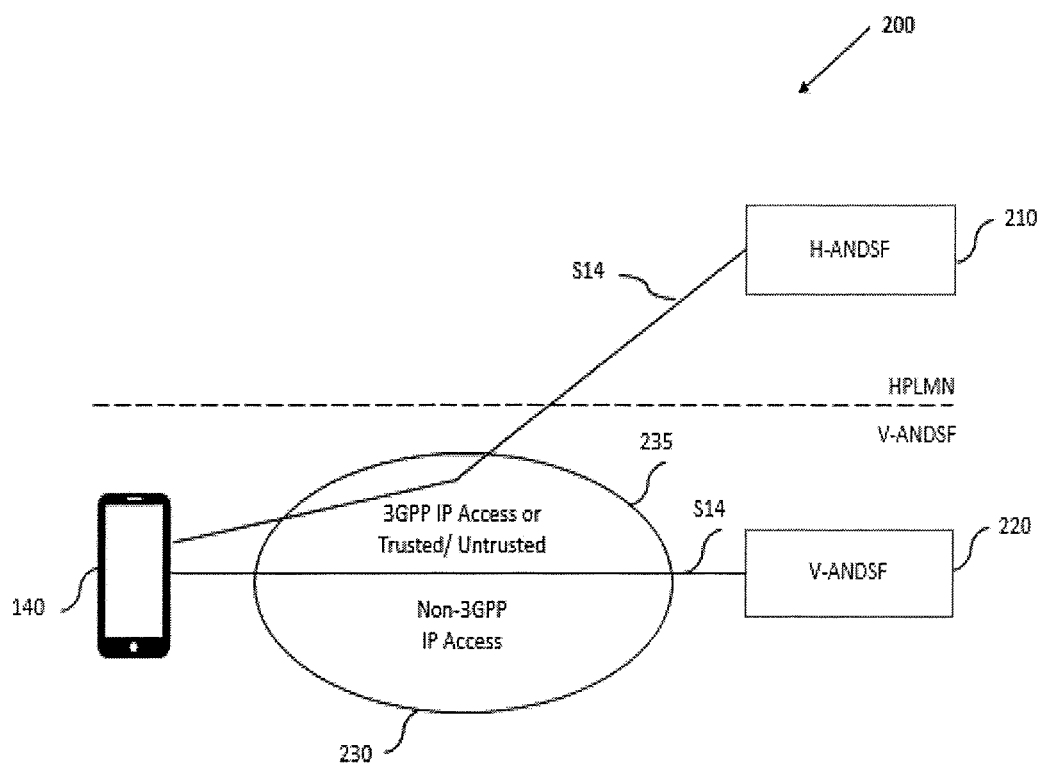
FIG. 2 illustrates an ANDSF architecture in accordance with a second embodiment of the present disclosure.

As illustrated in FIG. 2, the present disclosure encompasses indicating the logic to receive the eMBMS service through the second radio access technology [130] e.g. over the Wi-Fi channel, through an application level policy and as an example such an application level policy control could be the Access network discovery and selection function (ANDSF) entity. The service provider module [150] e.g. being the Wi-Fi Access Point (AP), may advertise capability of transmitting the eMBMS channels which may be the deciding factor if the user through the user equipment [140] will connect to such Wi-Fi access point.

The protocol to allow the user equipment [140] to update with information such as where, when and how to choose a non-3GPP access network [230] as against a 3GPP IP access network [235], may be implemented using the techniques defined in the TS 23.402 "Architecture enhancements for non-3GPP accesses" of the 3GPP specification, which defines the ANDSF (Access network discovery and selection function). Thus, referring to the FIG. 2, the TS 23.402 defines a direct interface between a user equipment [140] (UE) and the ANDSF server reachable through an internet protocol (IP) network. The user equipment [140] which is roaming (not within the home circle) may access both the ANDSF server of its Home operator (H-ANDSF) [210] and the ANDSF server of the visited network (V-ANDSF) [220], wherein the V-ANDSF shall take precedence in an event of conflict. The ANDSF information is represented by the ANDSF Management Object described in the TS 24.312 of the 3GPP specification, wherein the TS 24.312 of the 3GPP specification covers information such as: user equipment [140] location; Discovery information; Inter-System Mobility Policies; Inter-System Routing Policies. Further, the user equipment [140] location may be based on a geographical coordinate, a cellular cell or area, a WLAN location (HESSID-Homogeneous Extended Service Set ID, SSID, BSSID, etc.). Furthermore, the discovery information may be sent by the ANDSF server and allows the user equipment [140] to map from current location to a list of alternative access networks/radio access technologies which may be available. For e.g., a list of Wi-Fi access networks within the current LTE cell or at the current user equipment's [140] geographical location may be provided by the ANDSF server. In one embodiment, the discovery information provided by the ANDSF server may also contain Wi-Fi access points in the vicinity of a user equipment [140] which are transmitting a particular eMBMS service.

Moreover, an Access Network Query Protocol (ANQP), as defined in the IEEE 802.11u which is part of the HOTSPOT 2.0 specification, defines a number of standard Information Elements, which allow devices to query specific information such as location, cellular network roaming, emergency services support, and authentication realms. Further, the ANQP is a bidirectional exchange protocol that enables the user equipment [140] to provide values for these information elements to the access point or to an ANQP server during the exchange. As the Wi-Fi access point messages, may be limited in size, the ANQP allows the user equipment [140] to query a longer list of roaming consortium identifiers. In one embodiment, the ANQP is enhanced to provide information about the support of the eMBMS channels and any specific type of the eMBMS service that may be supported by the Hotspot 2.0 compliant Access Point.

In yet another embodiment, the eMBMS user service description (USD) or the bootstrap information may be used to indicate the Wi-Fi AP information along with the other necessary eMBMS information. The present disclosure encompasses using detecting the availability of the second radio access technology [130] e.g. the Wi-Fi channel, based on the at least one configuration parameter. The at least one configuration parameter may include, but not limited to, at least one signal strength information, SSID, PLMN, cell ID, frequency identifier, radio access technology, frequency band of the second radio access technology [130], TMGI and combination thereof.

Further, in an exemplary embodiment, the updated user service description (USD) is as given below:

```
v=0
o=ghost 2890844526 2890842807 IN IP6 2001:210:1:2:240:96FF:FE25:8EC9
s=3GPP MBMS Streaming FEC SDP Example
i=Example of MBMS streaming SDP file
u=http://www.infoserver.example.com/ae600
e=ghost@mailserver.example.com
c=IN IP6 FF1E:03AD::7F2E:172A:1E24
t=3034423619 3042462419
b=AS:15
a=FEC-declaration:0 encoding-id=1
a=FEC-OTI-extension:0 ACAEAA==
a=mbms-repair: 0 min-buffer-time=2600
a=source-filter: incl IN IP6 * 2001:210:1:2:240:96FF:FE25:8EC9
m=application 4006 UDP/MBMS-REPAIR *
b=AS:15
a=FEC:0
a=mbms-flowid:                     1=FF1E:03AD::7F2E:172A:1E24/4002,
2=FF1E:03AD::7F2E:172A:1E24/4003,
3=FF1E:03AD::7F2E:172A:1E24/4004,  4=FF1E:03AD::7F2E:172A:1E24/4005,
5=FF1E:03AD::7F2E:172A:1E24/2269
a=X-3gpp-FEC-Interleaving: 1="reverse", 2="ordered"
a=mbms-broadcast=tmgi – <tmgi1>
a=alternative : <tmgi>,<tmngi2> .....
w=embms-mutlicast<ssid_format>
w=alternative : <ssid1>,<ssid2> .....
```

In yet another embodiment, the USD or the bootstrap information may also contain protocols/policies on when to switch back to an LTE network or when to switch to the Wi-Fi channel for eMBMS service, and vice versa.

Figure 3:
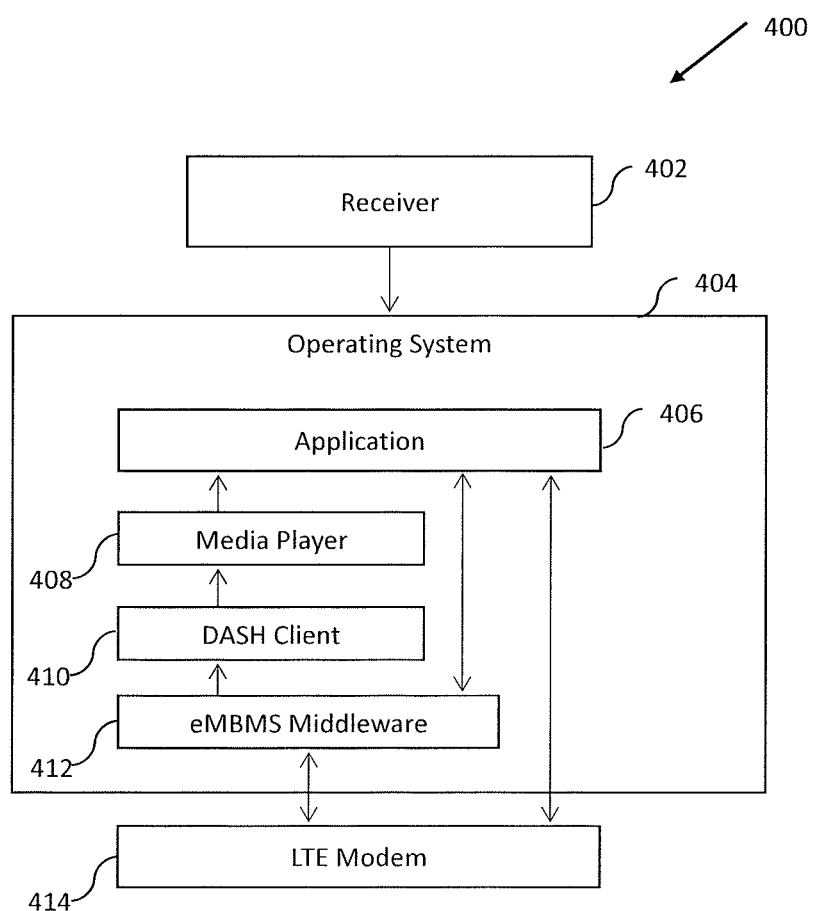
FIG. 3 illustrates an architecture pertaining to interaction between the user equipment and the service provider module.

FIG. 3 illustrates architecture pertaining to, in one embodiment, interaction between the user equipment [140] and the service provider module [150]. The architecture 400 comprises a receiver [402] for receiving the eMBMS service, an operating system [404], and a LTE modem [414], wherein the operating system [404] includes application [406], media player [408], DASH client [410], and an eMBMS middleware [412].

Figure 4:
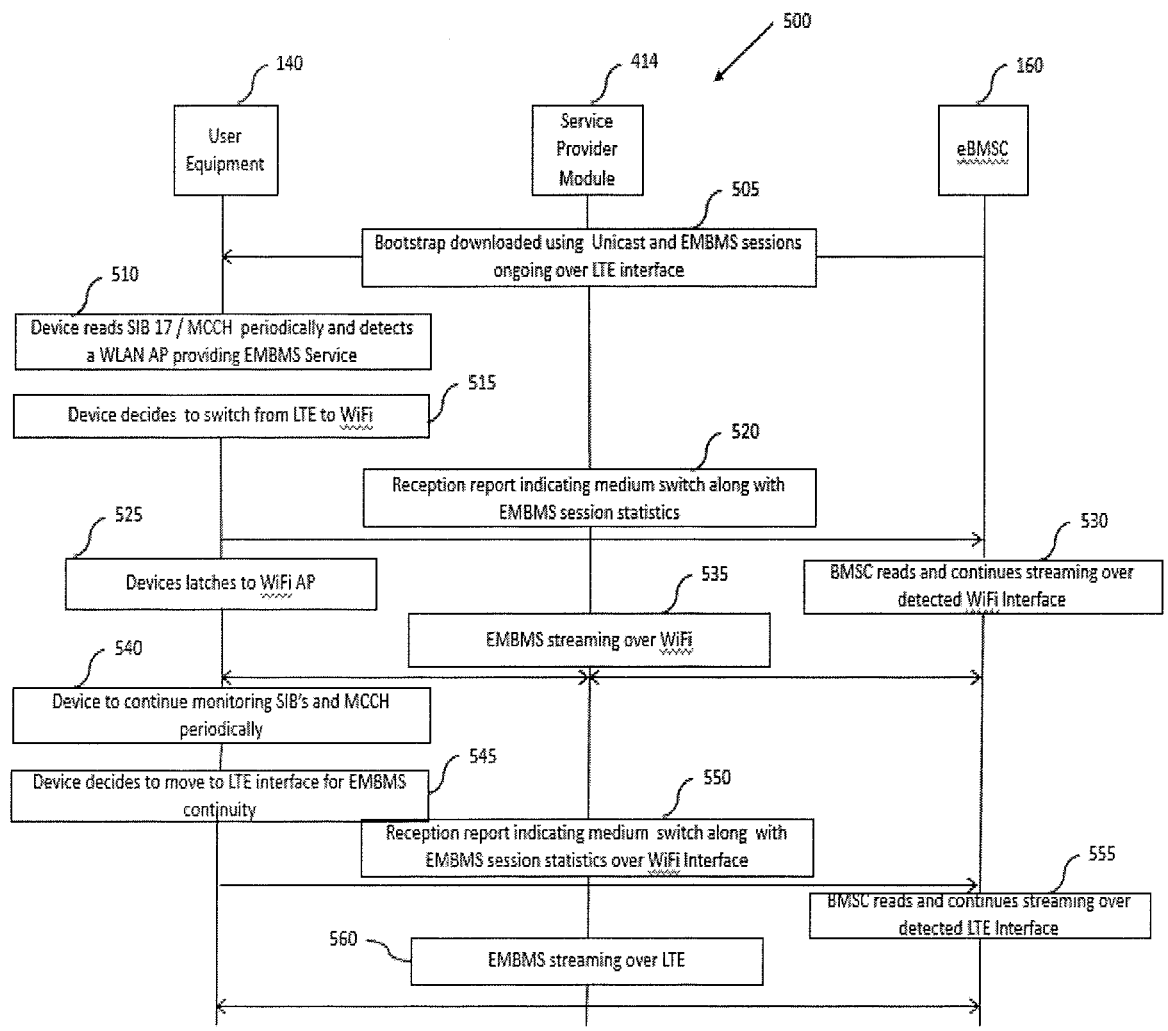
FIG. 4 illustrates an exemplary signaling diagram in one embodiment of the present disclosure.
Figure 5:
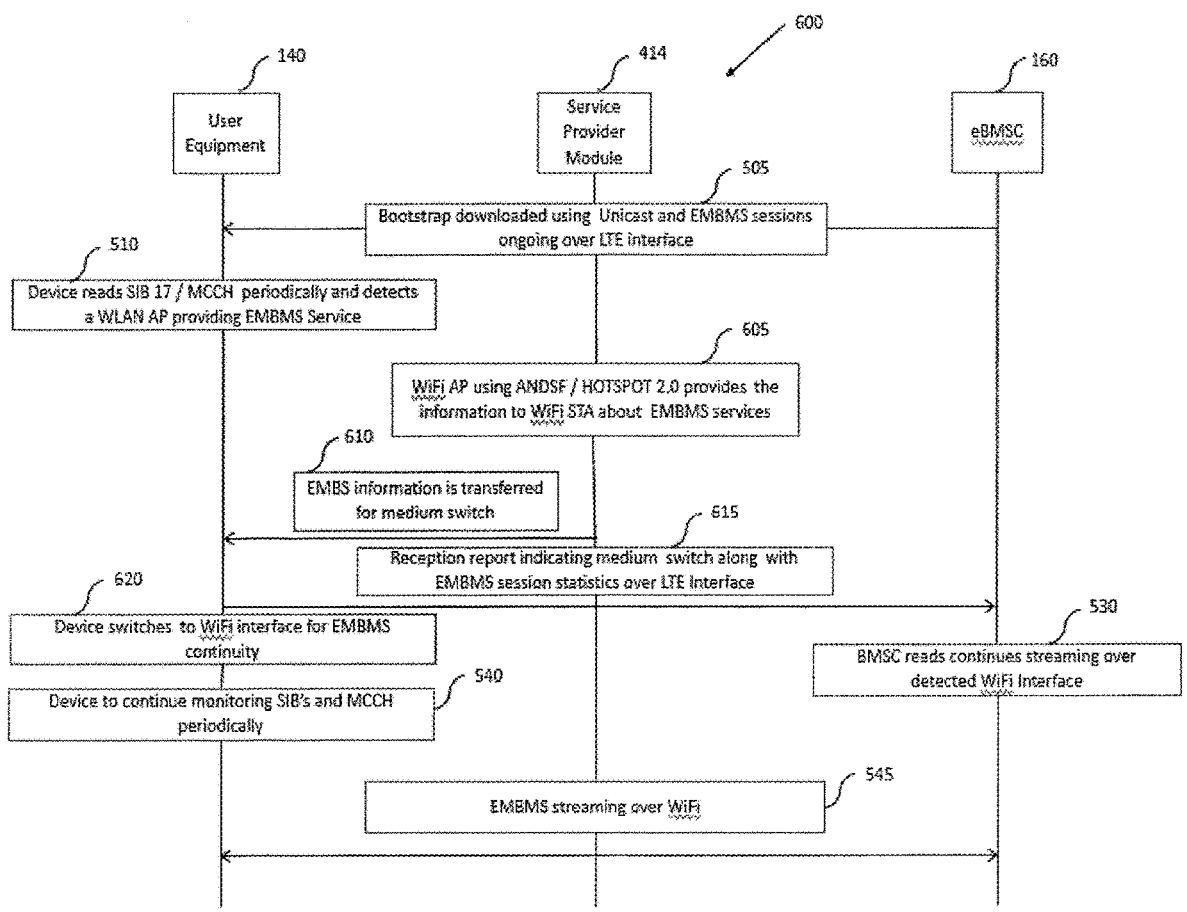
FIG. 5 illustrates an exemplary signaling diagram in another embodiment of the present disclosure.

As illustrated in FIG. 4 and FIG. 5, the present disclosure encompasses procedure for switching to a Wi-Fi Channel from LTE network using the USD/Bootstrap information/policies. The following includes detailed steps involved in the switching:

At step [505], the user equipment [140] downloads the bootstrap and start the eMBMS service over the first radio access technology [120] e.g. Medium 1 (e.g. Medium 1 as the LTE and Medium 2 as the Wi-Fi) as per the procedures defined in the 3GPP specification.

Further, the bootstrap information to include the WLAN details like SSID and EMBMS service related data.

At step [510], the user equipment [140] reads SIB 17/MCCH periodically to detect any WLAN APs present in its vicinity provides EMBMS services. Alternatively, at step [605], the Wi-Fi AP may provide necessary information pertaining to the eMBMS through the ANDSF protocol or the HOTSPOT 2.0 information.

At step [515], once the user equipment [140] reads and detects the Wi-Fi access point, the user equipment [140] reads relevant information from master file called bootstrap or the USD.

At step [520], the user equipment [140] sends reception report by including medium switch information; e.g. user equipment [140] selects the WLAN access point.

At step [535, 620], a middleware [412] residing at the user equipment [140] switches the eMBMS reception over the LTE interface/network to the WLAN interface.

At step [530], the BMSC having information pertaining to the ongoing session from reception report, starts streaming the eMBMS service over the WLAN interface.

At step [540], the user equipment [140] continuous to read the MCC and the relevant SIBs/MCCH to update the middleware [412] about the change in service or change in circle related information to ensure that the signaling exchange is ongoing/live over the LTE interface.

Further, when user equipment [140] moves away from the WLAN AP radar and switches to the LTE interface, this means that the user equipment [140] has prior information relating to the LTE interface such as ECGI, and TMGI, thereby allowing seamlessly switch of the eMBMS service from first radio access technology [120] to the second radio access technology [130] e.g. the LTE to the Wi-Fi and vice versa. and At step [535], the middleware [412] sends the reception report including medium switch information to the BMSC which the MBSC reads [555] and continuous streaming the eMBMS service over the LTE interface/link [560].

Though a limited number of the first radio access technology [120], the second radio access technology [130], the user equipment [140], the network entity [110] and the service provider module [150], have been shown in FIG. 1 and FIG. 2; however, it will be appreciated by those skilled in the art that the system [100] of the present disclosure encompasses any number and varied types of the entities/ elements such as the radio access technology, the user equipment [140], the network entity [110] and the service provider module [150].

Figure 6:
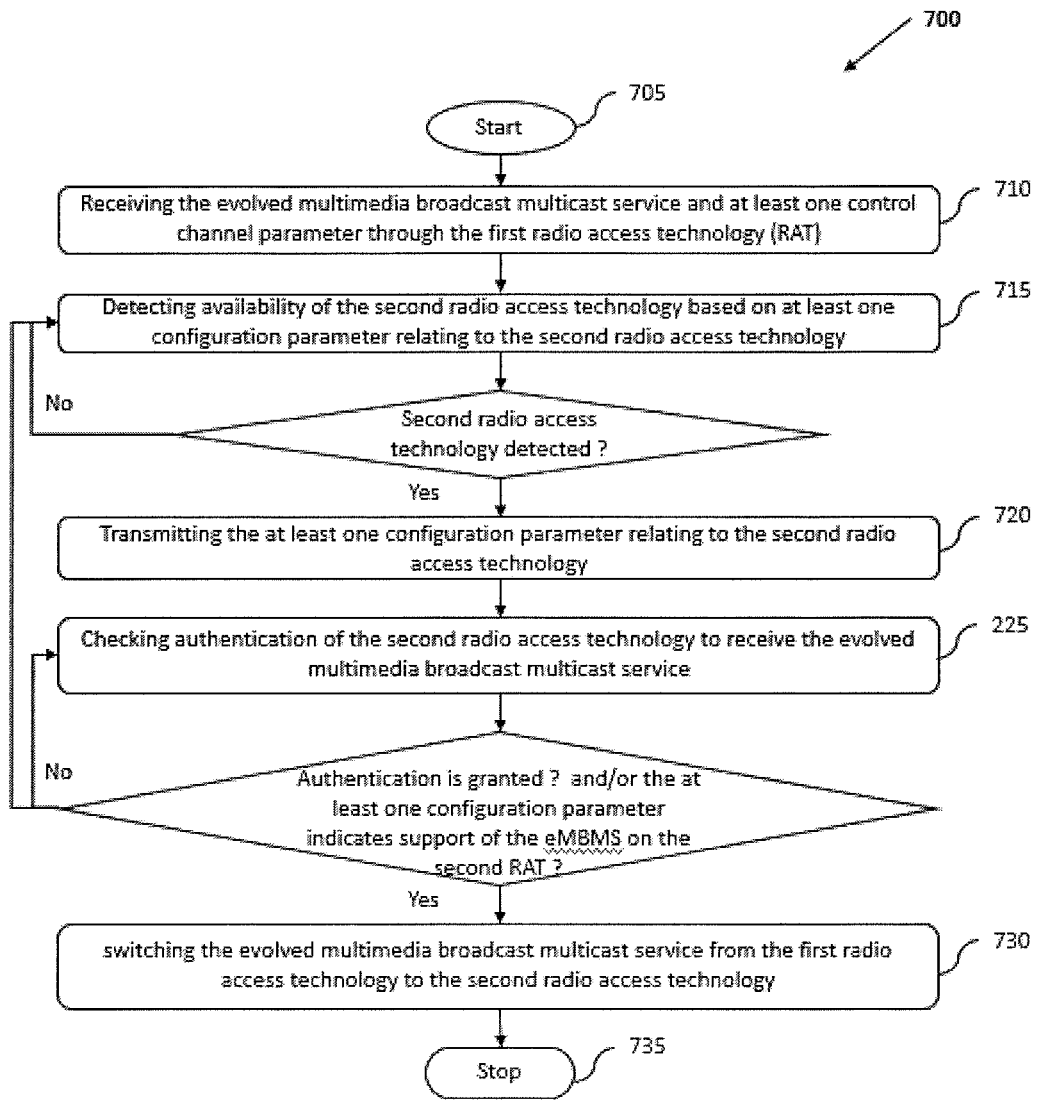
FIG. 6 illustrates an exemplary method flow diagram in one embodiments of the present disclosure.

FIG. 6 illustrates a method 700 of method of transmitting and switching transmission of an evolved multimedia broadcast multicast service from a first radio access technology [120] to a second radio access technology [130], in accordance with an embodiment of the present disclosure. The method 700 initiates at step 705.

At step 710, the evolved multimedia broadcast multicast service and at least one control channel parameter are received through the first radio access technology [120] by a user equipment [140]. The at least one control channel parameter is sent through at least one multimedia control channel (MCCH).

At step 715, the availability of the second radio access technology [130] is detected by the user equipment [140], wherein the detection is one of continuous, periodic and combination thereof. Further, the detection is based on at least one configuration parameter relating to the second radio access technology [130]. Furthermore, in another embodiment, the detection may be performed by the network entity [110], wherein the network entity [110] having a BMSC entity broadcast the arability of the eMBMS services to the user equipment [140].

At step 720, the at least one configuration parameter relating to the second radio access technology [130] is the transmitted by one of a network entity [110], a service provider module [150] and combination thereof to the user equipment [140].

At step 725, authentication of the second radio access technology [130] to receive the evolved multimedia broadcast multicast service is checked by the network entity [110] to generate an authentication report.

At step 730, the evolved multimedia broadcast multicast service from the first radio access technology [120] to the second radio access technology [130] is switched based on one of the at least one configuration parameter, the authentication report and combination thereof. The switching is done by one of the user equipment [140], the network entity [110] and combination thereof. The method 700 terminates at step 735.

While considerable emphasis has been placed herein on the disclosed embodiments, it will be appreciated that many embodiments can be made and that many changes can be made in the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

What is claimed is:

1. A method of transmitting and switching transmission of an evolved multimedia broadcast multicast service from a first radio access technology to a second radio access technology, the method being performed by a network entity, the method comprising:

transmitting, via one or more hardware processors of the network entity, the evolved multimedia broadcast multicast service and at least one control channel parameter through the first radio access technology to a user equipment, wherein the network entity includes at least one or more of an evolved node B, a BMSC (eMBMS Broadcast Multicast Service Controller), and an access network discovery and selection function (ANDSF) entity;

transmitting, via the one or more hardware processors of the network entity, at least one configuration parameter relating to the second radio access technology by one of a network entity, a service provider module and combination thereof to the user equipment;

checking, via the one or more hardware processors of the network entity, authentication of the second radio access technology to receive the evolved multimedia broadcast multicast service by the network entity to generate an authentication report; and switching, via the one or more hardware processors of the network entity, the evolved multimedia broadcast multicast service from the first radio access technology to the second radio access technology based on one of the at least one configuration parameter, the authentication report, a system information block information, a logic function transmitted by the access network discovery and selection function entity and combination thereof, by one of the user equipment, the network entity and combination thereof and switching the evolved multimedia broadcast multicast service from the second radio access technology to the first radio access technology when a value of the at least one configuration parameter drops below a predefined threshold, wherein the logic function indicates if the user equipment is capable of receiving the evolved multimedia broadcast multicast service through the second radio access technology, and logic function is broadcasted by the service provider module.

2. The method as claimed in claim 1, further comprising: updating the network entity upon switching from the first radio access technology to the second radio access technology, and vice-versa, wherein the updating is performed by one or more of the user equipment and the service provider processor.

3. The method as claimed claim 1, wherein the evolved multimedia broadcast multicast service includes one of a multicast service and a broadcast service.

4. The method as claimed in claim 1, wherein the multicast service and the broadcast service supports one or more of a video format, an audio format, emergency alert, and a text format.

5. The method as claimed in claim 1, wherein the first radio access technology includes one of a long term evolution, long term evolution advanced, HSPA, WCDMA and GSM network; and the second radio access technology includes one of an wireless fidelity network, a wireless LAN network, an IEEE standard on wireless fidelity, or unused spectrum in the VHF and UHF bands.

6. The method as claimed in claim 1, wherein the at least one control channel parameter includes information relating to sub-frame allocation and modulation coding scheme (MCS) of the evolved multimedia broadcast multicast service.

7. The method as claimed in claim 1, wherein configuration parameter includes at least one of signal strength information, SSID, PLMN, cell ID, frequency identifier, radio access technology, frequency band of the second radio access technology, and TMGI.

8. The method as claimed in claim 1, wherein the configuration parameter is broadcast by a network entity configured to communicate with the user equipment through the first radio access technology.

9. The method as claimed in claim 1, wherein the at least one configuration parameter includes information pertaining to the evolved multimedia broadcast multicast service supported by the service provider processor that is configured to communicate with the user equipment through the second radio access technology.

10. The method as claimed in claim 1, wherein the at least one configuration parameter includes one or more of a condition for switching from the first radio access technology to the second radio access technology, and a condition for switching from the second radio access technology to the first radio access technology.

11. The method as claimed in claim 1, further including at least one of:
reading a multimedia control channel to identify availability of the evolved multimedia broadcast multicast service on the first radio access technology; and
reading the multimedia control channel to identify compatibility of the evolved multimedia broadcast multicast service on the second radio access technology.

12. The method as claimed in claim 1, further including triggering the at least one control channel parameter through a multimedia control channel to indicate availability of the evolved multimedia broadcast multicast service on at least one of the first radio access technology and the second radio access technology.

13. A method of transmitting and switching transmission of an evolved multimedia broadcast multicast service by a user equipment from a first radio access technology to a second radio access technology, the method being performed by a user equipment, the method comprising:
receiving, via one or more hardware processors, the evolved multimedia broadcast multicast service and at least one control channel parameter through the first radio access technology from a network entity, wherein the network entity includes at least one or more of an evolved node B, a BMSC (eMBMS Broadcast Multicast Service Controller), and an access network discovery and selection function (ANDSF) entity;
detecting, via the one or more hardware processors, availability of the second radio access technology, wherein
the detection is based on at least one configuration parameter related to the second radio access technology;
receiving, via the one or more hardware processors, the at least one configuration parameter relating to the second radio access technology from a network entity;
receiving, via the one or more hardware processors, an authentication report that indicates whether the second radio access technology is authenticated to receive the evolved multimedia broadcast multicast service; and
switching, via the one or more hardware processors, the evolved multimedia broadcast multicast service from the first radio access technology to the second radio access technology based on one of the at least one configuration parameter, the authentication report, a system information block information, a logic function transmitted by the access network discovery and selection function entity and combination thereof and switching the evolved multimedia broadcast multicast service from the second radio access technology to the first radio access technology when a value of the at least one configuration parameter drops below a predefined threshold, wherein
the logic function indicates if the user equipment is capable receiving the evolved multimedia broadcast multicast service through the second radio access technology, and
the logic function is broadcasted by the service provider module.

14. The method as claimed in claim 13, further comprising: updating the network entity upon switching from the first radio access technology to the second radio access technology, and vice-versa, wherein the updating is performed by one or more of the user equipment and the service provider processor.

15. The method as claimed in claim 13, wherein the evolved multimedia broadcast multicast service includes one of a multicast service and a broadcast service.

16. The method as claimed in claim 13, wherein the multicast service and the broadcast service supports one or more of a video format, an audio format, emergency alert, and a text format.

17. The method as claimed in claim 13, wherein the first radio access technology includes one of a long term evolution, long term evolution advanced, HSPA, WCDMA and GSM network; and the second radio access technology includes one of an wireless fidelity network, a wireless LAN network, an IEEE standard on wireless fidelity, or unused spectrum in the VHF and UHF bands.

18. The method as claimed in claim 13, wherein the at least one control channel parameter includes information relating to sub-frame allocation and modulation coding scheme (MCS) of the evolved multimedia broadcast multicast service.

19. The method as claimed in claim 13, wherein configuration parameter includes at least one of signal strength information, SSID, PLMN, cell ID, frequency identifier, radio access technology, frequency band of the second radio access technology, and TMGI.

20. The method as claimed in claim 13, wherein the configuration parameter is broadcast by a network entity configured to communicate with the user equipment-through the first radio access technology.

21. The method as claimed in claim 13, wherein the at least one configuration parameter includes information pertaining to the evolved multimedia broadcast multicast service supported by the service provider processor that is configured to communicate with the user equipment through the second radio access technology.

22. The method as claimed in claim 13, wherein the at least one configuration parameter includes one or more of a condition for switching from the first radio access technology to the second radio access technology, and a condition for switching from the second radio access technology to the first radio access technology.

23. The method as claimed in claim 13, further including at least one of:
reading a multimedia control channel to identify availability of the evolved multimedia broadcast multicast service on the first radio access technology; and
reading the multimedia control channel to identify compatibility of the evolved multimedia broadcast multicast service on the second radio access technology.

24. The method as claimed in claim 13, further including triggering the at least one control channel parameter through a multimedia control channel to indicate availability of the evolved multimedia broadcast multicast service on at least one of the first radio access technology and the second radio access technology.

25. A system for transmitting and switching transmission of an evolved multimedia broadcast multicast service from a first radio access technology to a second radio access technology, the system comprising:

a network entity configured to:
transmit at least one configuration parameter relating to the second radio access technology to a user equipment, wherein
the network entity is one of an evolved node B, a broadcast multicast service controller, an access network discovery and selection function entity and combination thereof,
the user equipment receives the evolved multimedia broadcast multicast service
and at least one control channel parameter from the broadcast multicast service controller through the first radio access technology,
the least one control channel parameter is received through at least one multicast control to indicate the availability of second radio access technology supporting the evolved multimedia broadcast multicast service, and
the least one control channel parameter is a system information broadcast;
check authentication of the second radio access technology to receive the evolved multimedia broadcast multicast service to generate an authentication report, and
switch the evolved multimedia broadcast multicast service from the first radio access technology to the second radio access technology based on one of the authentication report, the at least one configuration parameter, a system information block information, a logic function transmitted by the access network discovery and selection function entity and combination thereof, wherein the logic function indicates if the user equipment is capable receiving the evolved multimedia broadcast multicast service through the second radio access technology; and
switch the evolved multimedia broadcast multicast service from the second radio access technology to the first radio access technology when a value of the at least one configuration parameter drops below a predefined threshold.

26. The system as claimed in claim 25, further comprising a service provider configured to transmit the at least one configuration parameter relating to the second radio access technology to the user equipment.

27. The system as claimed in claim 25, wherein one of the network entity and the user equipment is configured to reads the multimedia control channel to identify availability of the evolved multimedia broadcast multicast service on the first radio access technology.

28. The system as claimed in claim 25, wherein one or more of the network entity and the user equipment is configured to reads the multimedia control channel to identify compatibility of the evolved multimedia broadcast multicast service on the second radio access technology.

29. The system as claimed in claim 25, wherein one or more of the network entity and the user equipment is configured to triggers the at least one control channel parameter through the multimedia control channel to indicate availability of the evolved multimedia broadcast multicast service on one of the first radio access technology, the second radio access technology and combination thereof.

30. A system for transmitting and switching transmission of an evolved multimedia broadcast multicast service from a first radio access technology to a second radio access technology, the system comprising:
a user equipment configured to:
receive the evolved multimedia broadcast multicast service, at least one control channel parameter and combination thereof through the first radio access technology from a network entity, wherein the network entity includes at least one or more of an evolved node B, a BMSC (eMBMS Broadcast Multicast Service Controller), and an access network discovery and selection function (ANDSF) entity, and
detect availability of the second radio access technology, wherein
the detection is one of continuous, periodic and combination thereof, and the detection is based on at least one configuration parameter relating to the second radio access technology; and
a service provider module and the network entity configured to transmit at least one parameter relating to the second radio access technology to the user equipment, wherein
the transmission is based on detection of the second radio access technology;
wherein
the network entity is configured to check authentication of the second radio access technology to receive the evolved multimedia broadcast multicast service to generate an authentication report, and
the user equipment is configured to switch the evolved multimedia broadcast multicast service from the first radio access technology to the second radio access technology based on one of an access network discovery and selection function information broadcasted, the authentication report and combination thereof, wherein the access network discovery and selection function information is broadcasted by the service provider module and switch the evolved multimedia broadcast multicast service from the second radio access technology to the first radio access technology when a value of the at least one configuration parameter drops below a predefined threshold.

* * * * *